Sept. 18, 1923.
W. N. RETTINGER
GEAR SHIFTING DEVICE
Filed Feb. 24, 1923
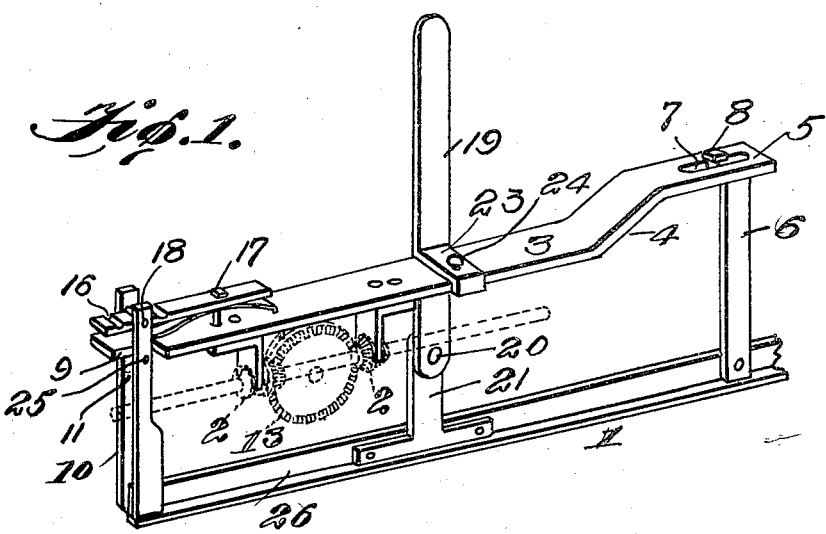
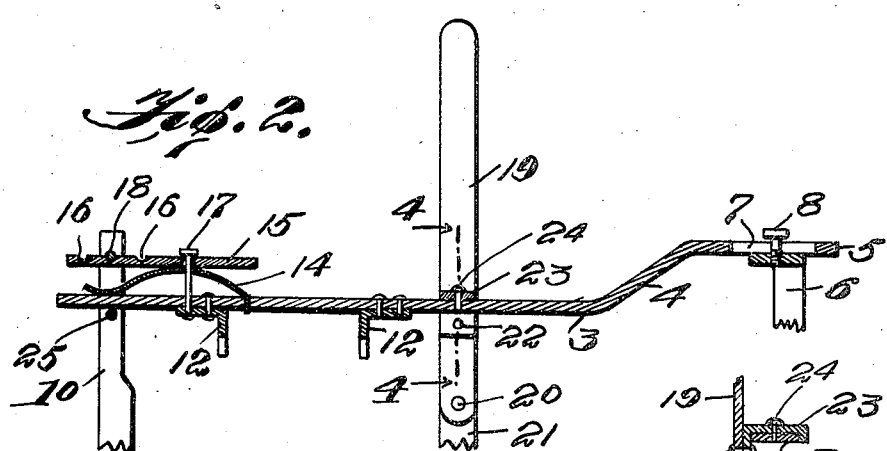
INVENTOR.
William N. Rettinger
BY
ATTORNEYS.

Patented Sept. 18, 1923.

1,468,400

UNITED STATES PATENT OFFICE.

WILLIAM N. RETTINGER, OF BOURBON, INDIANA.

GEAR-SHIFTING DEVICE.

Original application filed January 25, 1922, Serial No. 531,705. Divided and this application filed February 24, 1923. Serial No. 620,907.

*To all whom it may concern:*

Be it known that I, WILLIAM N. RETTINGER, a citizen of the United States, residing at Bourbon, in the county of Marshall and State of Indiana, have invented certain new and useful Improvements in Gear-Shifting Devices, of which the following is a specification, reference being had therein to the accompanying drawings.

This invention relates to a gear shifting device, and the object of the invention is the construction of a simple and efficient device for shifting gears.

Another object of the invention is the construction of a manually-operated gear shifting device which will be of markedly advantage in shifting the gears in connection with the driving mechanism of a washing machine.

This is a divisional case, growing out of my original application, Serial No. 531,705, "Washing machine."

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a perspective view of a device constructed in accordance with the present invention, while Figure 2 is a fragmentary view in side elevation, of the device shown in Fig. 1, partly in longitudinal section.

Figure 3 is a perspective view of the notched plate.

Figure 4 is a sectional view, taken on line 4—4, Fig. 2.

Referring to the drawings by numerals, 1 designates the gear shifting device, for gears 2; said gear shifting device 1 comprises a sliding bar 3, which is outwardly bent at 4 near one end, producing an end 5 above the main portion of the bar; this end 5 rests upon the top of the bracket 6, and is provided with a slot 7, in which screw 8 is positioned for holding bar 3 upon bracket 6, but allowing the bar to be slightly adjusted by a sliding action. The outer end of the bar 3 is reduced as at 9, and this reduced end is slidably mounted in the bifurcated, upper end of the bracket 10; this bifurcation 11 (Fig. 1) acts as a guide for the outer end of bar 3.

Angle, bifurcated lugs 12 are fastened to the under face of bar 3 and engage gears 2, so that when the bar 3 is slightly slid or adjusted upon the upper ends of brackets 6 and 10 one gear 2 will be placed in mesh with gear 13 and the other gear of the set will be placed out of mesh with said gear 13.

On the bar 3 is placed the flat spring 14, and on spring 14 is placed the plate 15. The plate 15 is provided with three notches 16. A fastener member, such as bolt 17, holds the spring 14 and plate 15 on the sliding bar 3. By pressing downward on plate 15, and sliding bar 3, the pin 18 can be placed in either one of the notches 16; when the pin 18 is in the inner notch, the inner cog 2 will be in mesh with gear 3; when pin 18 is in the outer notch, then the outer gear 2 will be in mesh with gear 3; when the pin 18 is in the central notch of bar 3 (Figs. 1 and 2) then the device is neutral, with neither gears 2 in mesh with gear 3. The flat, bowed spring 14 holds the plate 15 normally in engagement with pin 18 but the operator can depress the spring, by pushing downwardly on plate 15 to allow the shifting of bar 3 through lever 19, to place the gears 2 in the desired position.

The lever 19 is pivotally mounted, at 20, upon bracket 21 and is pivotally connected at 22 (Fig. 2) to the angle plate 23, which plate 23 straddles the bar 3 and is fastened by rivet 24 thereto. It will be understood that by a slight swinging movement of the lever 19, upon its pivot 20, that the bar 3 will be shifted, as hereinbefore stated, to control the movement or position of the gears 2.

The brackets 6, 10 and 21 are supported upon the angle support 26. The bifurcated bracket 10 is provided with a supporting pin 25 which pin supports one end of the sliding bar 3.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with a support, of a pair of brackets carried by said support, one of said brackets being bifurcated, a bar slidably mounted at one end upon the top of one bracket and at its other end mounted in the bifurcation of the bifurcated bracket, gear engaging means carried by said bar, lever means for adjusting said bar, and locking means for holding the bar in an adjusted position.

2. In a device of the class described, the combination with a support, of a bracket carried by said support, a gear adjusting bar slidably mounted upon said bracket, said bracket provided with a pin, a notched plate movably mounted upon said bar, a spring between said plate and bar for holding the plate with one of its notches engaging the pin, and lever means for adjusting the bar.

3. In a device of the class described, the combination with a support, of a gear adjusting bar slidably mounted upon said support, a notched plate above said bar, a bowed spring between said plate and bar, a bolt extending through said plate, spring and bar for holding the same together, means co-operating with the notches of said bar for locking the bar in different adjusted positions, and lever means movably connected to said bar.

4. In a device of the class described, the combination with a support, of brackets carried by said support, a bar provided with a slot near one end slidably mounted upon said brackets, a screw in said slot screwed into the top of one of said brackets, gear engaging means carried by said bar, locking means for holding said bar in different adjusted positions, and lever means movably connected to said bar.

In testimony whereof I hereunto affix my signature.

WILLIAM N. RETTINGER.